US011565968B2

(12) United States Patent
Guimard et al.

(10) Patent No.: US 11,565,968 B2
(45) Date of Patent: Jan. 31, 2023

(54) HEAT-TREATED MATERIAL HAVING LOW RESISTIVITY AND IMPROVED MECHANICAL PROPERTIES

(71) Applicant: SAINT-GOBAIN GLASS FRANCE, Courbevoie (FR)

(72) Inventors: Denis Guimard, Paris (FR); Johann Skolski, Paris (FR); Joël Bellemin, Draveil (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/291,890

(22) PCT Filed: Nov. 15, 2019

(86) PCT No.: PCT/FR2019/052719
§ 371 (c)(1),
(2) Date: May 6, 2021

(87) PCT Pub. No.: WO2020/099802
PCT Pub. Date: May 22, 2020

(65) Prior Publication Data
US 2022/0002191 A1 Jan. 6, 2022

(30) Foreign Application Priority Data

Nov. 16, 2018 (FR) ...................................... 1860589

(51) Int. Cl.
*C03C 17/36* (2006.01)
(52) U.S. Cl.
CPC ........ *C03C 17/366* (2013.01); *C03C 17/3626* (2013.01); *C03C 17/3642* (2013.01);
(Continued)

(58) Field of Classification Search
CPC .............. C03C 17/366; C03C 17/3644; C03C 17/3681; C03C 17/3649; C03C 2217/263; C03C 2217/268
See application file for complete search history.

(56) References Cited

U.S. PATENT DOCUMENTS

| 4,749,397 A | * | 6/1988 | Chesworth | .......... C03C 17/3644 |
|---|---|---|---|---|
| | | | | 65/60.5 |
| 5,229,881 A | * | 7/1993 | Day | .................... C03C 17/3652 |
| | | | | 204/192.27 |

(Continued)

FOREIGN PATENT DOCUMENTS

| CN | 106116175 A | * | 11/2016 | ............. C03C 17/36 |
|---|---|---|---|---|
| CN | 108191260 A | * | 6/2018 | ............. C03C 17/36 |

(Continued)

OTHER PUBLICATIONS

International Search Report as issued in International Patent Application No. PCT/FR2019/052719, dated Mar. 13, 2020.

*Primary Examiner* — Z. Jim Yang
(74) *Attorney, Agent, or Firm* — Pillsbury Winthrop Shaw Pittman LLP (57) ABSTRACT

A material includes a transparent substrate coated with a stack of thin layers including at least one silver-based functional metallic layer, at least one zinc-based metallic layer, located above and/or below a silver-based functional metallic layer, and at least one nickel oxide-based layer located above and/or below this silver-based functional metallic layer and separated from this layer by at least one crystallized dielectric layer.

17 Claims, 3 Drawing Sheets

(52) U.S. Cl.
CPC ...... *C03C 17/3644* (2013.01); *C03C 17/3649* (2013.01); *C03C 17/3681* (2013.01); C03C 2217/216 (2013.01); C03C 2217/228 (2013.01); C03C 2217/256 (2013.01); C03C 2217/261 (2013.01); C03C 2217/262 (2013.01); C03C 2217/281 (2013.01); C03C 2218/156 (2013.01)

(56) References Cited

U.S. PATENT DOCUMENTS

| | | | | | |
|---|---|---|---|---|---|
| 6,007,901 | A | * | 12/1999 | Maschwitz | C03C 17/3647 428/428 |
| 2002/0022132 | A1 | * | 2/2002 | Ebisawa | C03C 17/36 428/432 |
| 2004/0241406 | A1 | * | 12/2004 | Nadaud | C03C 17/3652 428/212 |
| 2006/0246300 | A1 | * | 11/2006 | Hevesi | C03C 17/3681 428/432 |
| 2006/0275613 | A1 | * | 12/2006 | Butz | C23C 14/0089 428/432 |
| 2009/0068447 | A1 | * | 3/2009 | Blacker | C03C 17/36 428/432 |
| 2009/0136765 | A1 | * | 5/2009 | Maschwitz | C03C 17/3652 427/160 |
| 2009/0186213 | A1 | * | 7/2009 | Ihlo | C03C 17/3652 428/336 |
| 2010/0178492 | A1 | * | 7/2010 | Schicht | C03C 17/366 428/336 |
| 2011/0308693 | A1 | * | 12/2011 | Van Nutt | B32B 7/12 156/60 |
| 2013/0057951 | A1 | * | 3/2013 | Hevesi | C03C 17/36 359/359 |
| 2014/0087100 | A1 | * | 3/2014 | Yaoita | C23C 14/083 428/34 |
| 2015/0140355 | A1 | * | 5/2015 | Suzuki | B32B 15/04 428/457 |
| 2016/0031751 | A1 | * | 2/2016 | Mahieu | C03C 17/3642 428/428 |
| 2016/0077320 | A1 | * | 3/2016 | Okada | C23C 14/10 204/192.27 |
| 2016/0273265 | A1 | * | 9/2016 | Myli | C03C 17/36 |
| 2018/0244567 | A1 | * | 8/2018 | Singh | C03C 17/366 |
| 2018/0251888 | A1 | * | 9/2018 | Boyce | C23C 14/0652 |
| 2018/0362397 | A1 | * | 12/2018 | Guimard | C03C 17/36 |
| 2019/0248700 | A1 | * | 8/2019 | Biswas | G02B 5/208 |
| 2020/0277223 | A1 | * | 9/2020 | You | C03C 17/3639 |

FOREIGN PATENT DOCUMENTS

| | | | |
|---|---|---|---|
| DE | 10 2005 039707 A1 | 3/2007 | |
| WO | WO-2007042687 A1 * | 4/2007 | ............ C03C 17/36 |
| WO | WO 2008/096089 A2 | 8/2008 | |

\* cited by examiner

Figure 2

Figure 3

HEAT-TREATED MATERIAL HAVING LOW RESISTIVITY AND IMPROVED MECHANICAL PROPERTIES

CROSS-REFERENCE TO RELATED APPLICATIONS

This application is the U.S. National Stage of PCT/FR2019/052719, filed Nov. 15, 2019, which in turn claims priority to French patent application number 1860589 filed Nov. 16, 2018. The content of these applications are incorporated herein by reference in their entireties.

The invention relates to a material comprising a transparent substrate coated with a stack of thin layers comprising at least one silver-based functional metallic layer. The invention also relates to glazings comprising these materials and also to the use of such materials for manufacturing thermal insulation and/or solar protection glazings.

Silver-based functional metallic layers (or silver layers) have advantageous properties of electrical conduction and of reflection of infrared (IR) radiation, hence their use in "solar control" glazings, targeted at reducing the amount of incoming solar energy, and/or in "low-emissivity" glazings, targeted at reducing the amount of energy dissipated toward the outside of a building or of a vehicle.

These silver layers are deposited between coatings based on dielectric materials generally comprising several dielectric layers (hereinafter "dielectric coatings") making it possible to adjust the optical properties of the stack. These dielectric layers additionally make it possible to protect the silver layer from chemical or mechanical attacks.

The optical and electrical properties of the materials depend directly on the quality of the silver layers, such as their crystalline state, their homogeneity and also their environment. The term "environment" is understood to mean the nature of the layers close to the silver layer and the surface roughness of the interfaces with these layers.

In order to improve the quality of silver-based functional metallic layers, it is known to use dielectric coatings comprising dielectric layers having a stabilizing function which are intended to promote the wetting and the nucleation of the silver layer. Crystallized zinc oxide-based dielectric layers are used in particular for this purpose. This is because the zinc oxide deposited by the cathode sputtering process crystallises without requiring additional heat treatment. The zinc oxide-based layer can thus serve as an epitaxial growth layer for the silver layer.

With this same objective, it is also known to use blocking layers located between a functional layer and a dielectric coating, these blocking layers having the function of protecting these functional layers from possible degradation during deposition of the upper dielectric coating and/or during a heat treatment. Numerous possibilities, varying in particular in the nature, the number and the position of said blocking layers, have been proposed.

The invention relates very particularly to stacks which have to undergo a high-temperature heat treatment, such as an annealing, a bending and/or a tempering.

In general, high-temperature heat treatments are liable to make the stacks more sensitive to scratches. Furthermore, when scratches are created in a material before heat treatment, they become considerably more visible after heat treatment.

The applicant has observed that stacks comprising, close to a silver layer, both blocking layers chosen from certain materials and/or having certain thicknesses and dielectric layers comprising zinc, in particular based on zinc oxide or based on zinc tin oxide, following the heat treatment advantageously exhibit improved scratch resistance properties, and disadvantageously exhibit deteriorated resistivity.

These phenomena appear partly linked to changes within the silver layer induced by the migration of species during the heat treatment. These changes impact not only the visual appearance but also the optical properties and the electrical conductivity of the stack.

The reasons for and mechanisms of the species migration are still poorly understood. Their occurrence appears to be strongly dependent on the nature of the blocking layers and of the dielectric layers constituting the dielectric coatings located close to the silver layer. The presence of certain dielectric materials in the stack, in particular of certain oxides, or of certain blocking layers, promotes the migration of certain species, in particular the release of metallic zinc elements close to the silver layer, via the reduction of the dielectric layers comprising zinc.

The improvement in the scratch resistance could be due to the doping of the silver layer with zinc.

The deterioration of the resistivity could be due to the presence of metallic zinc elements or due to zinc-related defects located at the upper or lower interface of the silver layer and/or at the grain boundary of the silver layer.

The presence of metallic zinc elements in the layer appears to make it possible to improve durability at the expense of resistivity.

On the basis of this observation, the applicant is interested in the effects of intentionally inserting a zinc-based metallic layer into stacks which are fragile from the point of view of scratch resistance and are intended to undergo a heat treatment. The objective is to obtain, by directly adding the metallic zinc elements, the positive effect on scratch resistance. By proceeding in this way, the improvement no longer depends on the creation of a mobile species of metallic zinc by reduction of the layer comprising zinc.

The applicant has thus surprisingly discovered that the insertion of a zinc-based metallic layer makes it possible not only to significantly improve the scratch resistance of the silver stacks but also to drastically reduce hot corrosion and cold corrosion in humid environments.

These improvements are however accompanied by a deterioration in the resistivity and the absorption.

This solution, which consists simply in adding a zinc-based metallic layer, is not completely satisfactory the obtaining of a low light absorption and a low emissivity is sought.

The object of the present invention is to develop a material which exhibits, after one or more high-temperature heat treatments, a low resistivity and hence a low emissivity, moderate absorption and excellent mechanical properties reflected by an excellent scratch resistance.

The applicant has discovered, surprisingly, that the joint presence of a zinc-based metallic layer and of a nickel oxide-based layer close to a silver-based layer made it possible to achieve these objectives.

The invention thus relates to a material comprising a transparent substrate coated with a stack of thin layers comprising at least one silver-based functional metallic layer and at least two dielectric coatings, each dielectric coating including at least one dielectric layer, so that each functional metallic layer is disposed between two dielectric coatings, characterized in that the stack comprises:

at least one zinc-based metallic layer, located above and/or below a silver-based functional metallic layer, at least one nickel oxide-based layer located above and/or below this silver-based functional metallic layer and separated from this layer by at least one crystallized dielectric layer.

According to one particularly advantageous embodiment, a zinc oxide-based crystallized dielectric layer is located below and in contact with the nickel oxide-based layer.

The zinc-based metallic layer is situated in a dielectric coating in contact with said silver-based functional metallic layer. This means that the zinc-based metallic layer is not separated from said silver-based functional metallic layer by another silver-based functional metallic layer.

The presence of a metallic zinc layer close to the silver layer causes, during the heat treatment, the migration of metallic zinc elements into the silver layer following the heat treatment.

The migration of metallic zinc elements into the silver layer following the heat treatment makes it possible to improve the scratch resistance after heat treatment regardless of the structure of the stack. The zinc-based metallic layer thus makes it possible to improve the mechanical strength.

The presence of a nickel oxide-based layer makes it possible to completely eliminate the deterioration in the resistivity and to partly reduce the increase in the absorption which are normally induced by the zinc-based metallic layer.

It is particularly interesting to note that the nickel oxide-based layer makes it possible to restore the deteriorated properties without otherwise losing the advantageous properties induced by the zinc-based metallic layer.

Specifically, the solution of the invention makes it possible to significantly improve the scratch resistance of the silver stacks but also to drastically reduce the hot corrosion and cold corrosion in humid environments.

As a result, the present invention is suitable for all applications using stacks comprising silver-based functional layers and intended to be heat-treated and in which it is sought to improve the mechanical properties and in particular the scratch resistance.

The highly favorable effect on the reduction in the resistivity is obtained when the nickel oxide-based layer is not directly in contact with this silver-based metallic functional layer.

The invention thus makes it possible to develop a material comprising a substrate coated with a stack comprising at least one silver-based functional metallic layer exhibiting, following a heat treatment of bending, tempering or annealing type:
  a lower scratchability and
  a significantly improved resistance to hot and cold corrosion,
  the maintenance of a low resistivity,
  a moderate increase in absorption.

The solution of the invention is suitable in the case of stacks having a number of silver-based functional layers, in particular stacks having two or three functional layers which are particularly fragile from the point of view of scratches.

The present invention is also suitable in the case of stacks with a single silver-based functional layer which are intended for applications in which the stacks are highly subject to cold corrosion in a humid environment. This is in particular the case of single glazing comprising stacks with a single silver layer which are used as glazing for refrigerator doors.

The invention also relates to:
  a glazing comprising a material according to the invention,
  a glazing comprising a material according to the invention fitted on a vehicle or on a building, and
  the process for preparing a material or a glazing according to the invention,
  the use of a glazing according to the invention as solar control and/or low-emissivity glazing for the construction industry or vehicles,
  a building, a vehicle or a device comprising a glazing according to the invention.

Throughout the description, the substrate according to the invention is regarded as being positioned horizontally. The stack of thin layers is deposited above the substrate. The meaning of the expressions "above" and "below" and "lower" and "upper" is to be considered with respect to this orientation. Unless specifically stipulated, the expressions "above" and "below" do not necessarily mean that two layers and/or coatings are positioned in contact with one another. When it is specified that a layer is deposited "in contact" with another layer or with a coating, this means that there cannot be one (or more) layer(s) inserted between these two layers (or layer and coating).

All the light characteristics described are obtained according to the principles and methods of the European standard EN 410 relating to the determination of the light and solar characteristics of the glazings used in the glass for the construction industry.

A glazing for the construction industry generally delimits two spaces: a space described as "exterior" and a space described as "interior". It is considered that the sunlight entering a building goes from the exterior toward the interior.

According to the invention, the light characteristics are measured according to the D65 illuminant at 2° perpendicularly to the material fitted in a double glazing:
  LT corresponds to the light transmission in the visible region in %,
  Rext corresponds to the external light reflection in the visible region in %, with the observer on the external space side,
  Rint corresponds to the internal light reflection in the visible region in %, with the observer on the internal space side,
  a*T and b*T correspond to the colors in transmission a* and b* in the L*a*b* system,
  a*Rext and b*Rext correspond to the colors in reflection a* and b* in the L*a*b* system, with the observer on the external space side,
  a*Rint and b*Rint correspond to the colors in reflection a* and b* in the L*a*b* system, with the observer on the internal space side, The preferred characteristics which appear in the continuation of the description are applicable both to the material according to the invention and, if appropriate, to the glazing or to the process according to the invention.

The stack is deposited by magnetic-field-assisted cathode sputtering (magnetron process). According to this advantageous embodiment, all of the layers of the stack are deposited by magnetic-field-assisted cathode sputtering.

Unless otherwise indicated, the thicknesses mentioned in the present document are physical thicknesses and the layers are thin layers. The term "thin layer" is intended to mean a layer having a thickness of between 0.1 nm and 100 micrometers.

According to a particularly advantageous embodiment, an oxide-based, in particular zinc oxide-based, crystallized dielectric layer can be located below the nickel oxide-based layer, preferably in contact.

According to a particularly advantageous embodiment, the stack can comprise the sequence:
- an oxide-based crystallized layer, and in particular a zinc oxide-based layer,
- a nickel oxide-based layer located above and in contact with the zinc oxide-based crystallized layer, and
- an oxide-based crystallized layer, and in particular a zinc oxide-based layer, located above and in contact with the nickel oxide-based layer.

This sequence may be situated above and/or below the silver-based functional metallic layer.

According to a particularly advantageous embodiment, the dielectric coating located directly below the silver-based functional metallic layer includes at least one crystallized dielectric layer based on an oxide, in particular based on zinc oxide, optionally doped using at least one other element, such as aluminum. Advantageously, the oxide-based, in particular zinc oxide-based, crystallized dielectric layer can be located:
- between the silver-based functional metallic layer and the nickel oxide-based layer, preferably in contact with the nickel oxide layer and/or in contact with the silver-based functional metallic layer, and/or
- below the nickel oxide-based layer, preferably in contact.

When the nickel oxide-based layer is located above an, in particular zinc oxide-based, crystallized dielectric layer, this underlying crystallized layer enables good crystallization of the nickel oxide layer by epitaxial growth above the crystallized layer.

Specifically, nickel oxide, in contrast to zinc oxide, does not crystallize very well under cold conditions and under the conditions of conventional cathode sputtering deposition, that is to say under vacuum at ambient temperature, unless it is deposited on a crystallized layer such as a zinc oxide layer. The combination in the stack of a zinc oxide crystallized layer below a nickel oxide-based layer makes it possible to crystallize the nickel oxide layer.

Good crystallization of the nickel oxide-based layer has two advantages.

The first is the decrease in the absorption induced by the nickel oxide-based layer. A well crystallized layer is less absorbent.

The second advantage is that in the case of the deposition of a crystallized layer above the nickel oxide-based layer, the nickel oxide layer affects the crystallization of this overlying layer to a certain extent.

Specifically, the nickel oxide-based layer may be located below, preferably in contact with, a crystallized dielectric layer which is conventionally used as a wetting layer for the silver-based functional layer. In this case, the nickel oxide-based layer to a certain extent affects the crystallization of this so-called wetting crystallized layer, this layer in turn then affecting the crystallization of the overlying silver-based layer.

In the optimum configuration, the nickel oxide-based layer is situated between two crystallized dielectric layers, for example based on zinc oxide. The lower crystallized dielectric layer acts as growth layer ("seed layer") for the nickel oxide-based layer, thus making it less absorbent. The nickel oxide layer to a lesser extent acts as a growth layer for the upper crystallized dielectric layer. The upper crystallized dielectric layer acts as a growth and wetting layer for the silver layer.

The solution of the invention makes it possible to obtain low sheet resistance values, in particular of the same order as, or even lower than, those obtained for materials not comprising the zinc-based metallic layer. For this, the thickness of the nickel oxide-based layer should be optimized depending on the stack and in particular depending on the thickness of the zinc-based metallic layer and on the presence or absence of a blocking layer.

Lastly, surprisingly, a decrease in the absorption is observed despite the increase in the thickness of the nickel oxide-based layers. The solution of the invention thus makes it possible to significantly lower the absorption but does not make it possible to obtain values as low as those obtained with materials without zinc-based metallic layer and without nickel oxide-based layer.

One possible explanation is as follows.

The presence of a metallic zinc layer close to the silver layer causes, during the heat treatment, the migration of metallic zinc elements into the silver layer following the heat treatment. As explained above, the improvement in the mechanical strength and the deterioration in the resistivity and in the absorption are attributed to the migration of these metallic zinc elements into the silver layer during the heat treatment.

It is probable that the nickel oxide-based layer makes it possible to a certain extent to attract to said layer all or some of the metallic zinc elements which have migrated into the silver layer and are situated at the interfaces or between the grain boundaries of the silver layer. This removal makes it possible to regain excellent resistivity values and to lower the absorption.

This explanation is corroborated by studying the visibility of scratches. The determination of the visibility of scratches takes into account the optical properties of the stack and more particularly the reflection properties of the scratched portions of the stack.

The examples show that an excellent scratch resistance is obtained for nickel oxide-based layer thicknesses of between 1 and 3 nm, which is reflected by the low scratch widths.

Lastly, the migration conditions of the metallic zinc elements:
- from the zinc-based metallic layer to the silver layer or
- from the silver layer to the nickel oxide-based layer may be different. This is because they depend on the nature of the layers nearby but also on the temperature of the heat treatment.

One explanation would be that only a small proportion of metallic zinc participates in the improvement of the mechanical properties. The remaining metallic zinc which does not participate in the improvement of the mechanical properties is liable to degrade the resistivity. However, this remaining zinc is "pumped" by the nickel oxide-based layer, thus making it possible to avoid the deterioration in the resistivity.

In the following paragraphs, these zinc-based metallic layers are defined as they are obtained during the deposition, that is to say before heat treatment. Insofar as the heat treatment induces the migration of metallic zinc elements into the stack, it is not possible to determine with certainty, according to the deposited thicknesses, how this metallic zinc layer is modified following the heat treatment.

The term "metallic layer" is understood to mean a layer not comprising more than 30%, 20% or 10% of oxygen and/or nitrogen as atomic percent in the layer.

The layers are deposited in metallic form. Following the deposition and before heat treatment, they should not contain more than 10% of oxygen and/or nitrogen. However, depending on the nature of the layer deposited directly above, these zinc-based metallic layers are liable to undergo partial oxidation possibly leading to higher proportions of oxygen or nitrogen. These proportions are however less than 30% or 20%. In any case, at least a portion of the thickness of these zinc-based metallic layers is not oxidized or nitrided.

The zinc-based metallic layers (before heat treatment) comprise at least 20%, at least 30%, at least 40%, at least 50%, at least 60%, at least 70%, at least 80%, at least 90%, at least 95%, at least 96%, at least 97%, at least 98%, at least 99% or 100% by weight of zinc relative to the weight of the zinc-based metallic layer.

The zinc-based metallic layers may be chosen from:
metallic zinc layers,
metallic doped zinc layers,
zinc alloy-based metallic layers.

According to the invention, the term "metallic zinc layer" is understood to mean metallic layers of pure zinc which may nevertheless comprise some impurities. In this case, the total weight of zinc represents at least 99% by weight of the weight of the zinc-based metallic layer.

According to the invention, the doped zinc layers comprise at least 90.0%, at least 95%, at least 96%, at least 97%, at least 98% or at least 99% by weight of zinc of the weight of the zinc-based metallic layer.

The doped zinc layers may be chosen from the layers based on zinc and on at least one element chosen from titanium, nickel, aluminum, tin, niobium, chromium, magnesium, copper, silicon, silver or gold.

According to the invention, the zinc alloy-based layers comprise at least 20%, at least 30%, at least 40%, at least 50%, at least 60%, at least 70%, at least 80% or at least 90% by weight of zinc of the weight of the zinc-based metallic layer.

The zinc alloy-based layers can be chosen from layers based on zinc and on at least one element chosen from titanium, nickel, chromium and tin. By way of example, mention may be made of binary alloys of zinc and titanium such as $Zn_2Ti$ or ternary alloys based on zinc, nickel and chromium such as ZnNiCr.

The thickness of the zinc-based metallic layer is from 0.2 to 10 nm.
The thickness of the zinc-based metallic layer can be:
greater than or equal to 0.2 nm, greater than or equal to 0.5 nm, greater than or equal to 1.0 nm, greater than or equal to 1.2 nm or greater than or equal to 1.5 nm, or greater than or equal to 2 nm and/or
less than or equal to 10 nm, less than or equal to 8 nm, less than or equal to 7 nm, less than or equal to 6 nm, less than or equal to 5 nm or less than or equal to 4 nm.

The zinc-based metallic layer can be located above and/or below a silver-based functional metallic layer, directly in contact with or separated by one or more layers from the silver-based functional metallic layer.

Preferably, the zinc-based metallic layer or layers is/are located above the silver-based functional metallic layer.

The nickel oxide-based layers comprise at least 20%, at least 30%, at least 40%, at least 50%, at least 60%, at least 70%, at least 80%, at least 90%, at least 95%, at least 96%, at least 97%, at least 98%, at least 99% or 100% by weight of nickel relative to the total weight of all the elements constituting the nickel oxide-based layer excluding oxygen and nitrogen.

The nickel oxide-based layers can comprise one or more elements chosen from chromium, titanium, aluminum or molybdenum.

The nickel oxide-based layer can comprise at least 1%, at least 2%, at least 5%, at least 8%, at least 10%, at least 15%, at least 20%, at least 30%, at least 40%, at least 50%, at least 60%, at least 70% or at least 80% by weight of elements other than nickel relative to the total weight of all the elements constituting the nickel oxide-based layer excluding oxygen and nitrogen.

A priori, the nickel oxide-based layer is not nitrided, though traces may be present.

The nickel oxide-based layer comprises, in increasing order of preference, at least 80%, at least 90%, at least 95%, at least 98% or at least 100% by weight of oxygen relative to the total weight of oxygen and nitrogen.

The nickel oxide-based layer or layers have a thickness of between 0.2 and 10.0 nm, or between 0.6 and 8.0 nm, or between 1.0 and 5.0 nm.

The thickness of a nickel oxide-based layer may for example be:
greater than or equal to 0.2 nm, greater than or equal to 0.5 nm, greater than or equal to 1.0 nm, greater than or equal to 1.2 nm, greater than or equal to 1.5 nm, greater than or equal to 2.0 nm, greater than or equal to 2.5 nm or greater than or equal to 3.0 nm and/or
less than or equal to 10 nm, less than or equal to 8 nm, less than or equal to 7 nm, less than or equal to 6 nm, less than or equal to 5 nm or less than or equal to 4 nm, less than or equal to 3 nm, less than or equal to 2 nm or less than or equal to 1 nm.

The thickness of the only or of all the layers separating the nickel oxide-based layer and the silver-based functional metallic layer is between 0.5 and 15.0 nm, or between 0.7 and 8.0 nm, or between 1.0 and 6.0 nm.

The nickel oxide-based layer can be chosen from a layer of an oxide of nickel and chromium (NiCrOx), a layer of an oxide of nickel and titanium (NiTiOx) or a layer of an oxide of nickel and aluminum (NiAlOx).

Preferably, a layer of an oxide of nickel and chromium comprises, in increasing order of preference, relative to the total weight of all the elements constituting the nickel oxide-based layer excluding oxygen and nitrogen:
at least 40%, at least 50%, at least 60%, at least 70%, at least 75% or at least 75% by weight of nickel and/or
at least 60%, at least 50%, at least 40%, at least 30%, at least 25%, at least 20%, at least 15%, at least 10%, or at least 5% by weight of chromium.

Preferably, a layer of an oxide of nickel and titanium comprises, in increasing order of preference, relative to the total weight of all the elements constituting the nickel oxide-based layer excluding oxygen and nitrogen:
at least 40%, at least 50%, at least 60%, at least 70% or at least 75% by weight of nickel and/or
at least 60%, at least 50%, at least 40%, at least 30%, at least 25%, at least 20%, at least 15%, at least 10%, or at least 5% by weight of titanium.

Preferably, a layer of an oxide of nickel and aluminum comprises, in increasing order of preference, relative to the total weight of all the elements constituting the nickel oxide-based layer excluding oxygen and nitrogen:
at least 40%, at least 50%, at least 60%, at least 70% or at least 75% by weight of nickel and/or
at least 60%, at least 50%, at least 40%, at least 30%, at least 25%, at least 20%, at least 15%, at least 10%, or at least 5% by weight of aluminum.

According to the invention, the crystallized dielectric layers correspond to dielectric layers which are also called "stabilizing layer" or "wetting layer". The term "stabilizing layer" is understood to mean a layer made of a material capable of stabilizing the interface with the functional layer. These layers are generally based on zinc oxide.

The zinc oxide-based layers can comprise at least 50%, at least 60%, at least 70%, at least 80%, at least 90%, at least 95%, at least 96%, at least 97%, at least 98%, at least 99% or 100% by weight of zinc relative to the total weight of all the elements constituting the zinc oxide-based layer excluding oxygen and nitrogen.

In order to be correctly crystallized by cathode sputtering deposition, the zinc oxide-based layers advantageously comprise at least 80%, or at least 90%, by weight of zinc relative to the total weight of all the elements constituting the zinc oxide-based layer excluding oxygen and nitrogen.

The zinc oxide-based layers can comprise one or more elements chosen from aluminum, titanium, niobium, zirconium, magnesium, copper, silver, gold, silicon, molybdenum, nickel, chromium, platinum, indium, tin and hafnium, preferably aluminum.

The zinc oxide-based layers can optionally be doped using at least one other element, such as aluminum.

A priori, the zinc oxide-based layer is not nitrided, however traces may be present.

The zinc oxide-based layer comprises, in increasing order of preference, at least 80%, at least 90%, at least 95%, at least 98% or at least 100% by weight of oxygen relative to the total weight of oxygen and nitrogen.

The thickness of a zinc oxide-based layer may for example be:
  greater than or equal to 1 nm, greater than or equal to 2 nm, greater than or equal to 3 nm, greater than or equal to 4 nm, greater than or equal to 5 nm, greater than or equal to 6 nm, greater than or equal to 7 nm, greater than or equal to 8 nm or greater than or equal to 9 nm and/or
  less than or equal to 25 nm, less than or equal to 20 nm, less than or equal to 15 nm, less than or equal to 13 nm, less than or equal to 12 nm, less than or equal to 11 nm, less than or equal to 10 nm, less than or equal to 9 nm or less than or equal to 8 nm.

The oxide-based, in particular zinc oxide-based, crystallized dielectric layer can be in contact with the nickel oxide layer and/or in contact with the silver-based functional metallic layer.

The silver-based metallic functional layers can be "protected" by a layer referred to as a blocking layer. A blocking layer located above a silver-based functional metallic layer is called a blocking overlayer. A blocking layer located below a silver-based functional metallic layer is called a blocking underlayer.

The stack can comprise at least one blocking overlayer, preferably located directly in contact with the silver-based functional metallic layer.

The stack can comprise at least one blocking underlayer, preferably located directly in contact with the silver-based functional metallic layer.

The blocking layers are chosen from metallic layers based on a metal or on a metal alloy, metal nitride layers, metal oxide layers and metal oxynitride layers of one or more elements chosen from titanium, nickel, chromium, tantalum and niobium, such as Ti, TiN, TiOx, Nb, NbN, Ni, NiN, Cr, CrN, NiCr or NiCrN.

When these blocking layers are deposited in the metal, nitride or oxynitride form, these layers can undergo a partial or complete oxidation according to their thickness and the nature of the layers which frame them, for example, during the deposition of the following layer or by oxidation in contact with the underlying layer.

The blocking layers can be chosen from metallic layers, in particular layers of an alloy of nickel and of chromium (NiCr) or of titanium.

Advantageously, the blocking layers are nickel-based metallic layers. The nickel-based metallic blocking layers (before heat treatment) can comprise at least 20%, at least 30%, at least 40%, at least 50%, at least 60%, at least 70%, at least 80%, at least 90%, at least 95%, at least 96%, at least 97%, at least 98%, at least 99% or 100% by weight of nickel relative to the weight of the nickel-based metallic layer.

The nickel-based metallic layers may be chosen from:
  metallic nickel layers,
  metallic doped nickel layers,
  nickel alloy-based metallic layers.

The nickel alloy-based metallic layers can be based on an alloy of nickel and of chromium.

Each blocking layer has a thickness of between 0.1 and 5.0 nm. The thickness of these blocking layers can be:
  at least 0.1 nm, at least 0.2 nm, at least 0.5 nm, and/or
  at most 5.0 nm, at most 4.0 nm, at most 3.0 nm, at most 2.0 nm.

The zinc-based metallic layer and the nickel oxide-based layer can be:
  separated by the silver-based functional metallic layer,
  located above the silver-based functional metallic layer,
  located below the silver-based functional metallic layer.

Preferably, the zinc-based metallic layer or layers is/are located above a silver layer and above a blocking overlayer. In this configuration, the zinc-based metallic layer is located above the silver-based functional metallic layer and is separated from this layer by at least one blocking overlayer.

However, other configurations are possible.

The zinc-based metallic layer can be located:
  above a silver-based functional metallic layer, the metallic zinc layer is in contact with the silver-based functional metallic layer (Ag/Zn sequence),
  above a silver-based functional metallic layer, the metallic zinc layer is separated from the silver-based functional metallic layer by at least one blocking overlayer (Ag/blocking layer/Zn sequence),
  above a silver-based functional metallic layer and below and in contact with a crystallized dielectric layer, the metallic zinc layer is in contact with the silver-based functional metallic layer (Ag/Zn/crystallized layer sequence),
  above a silver-based functional metallic layer and below and in contact with a crystallized dielectric layer, the metallic zinc layer is separated from the silver-based functional metallic layer by at least one blocking overlayer (Ag/blocking layer/Zn/crystallized layer sequence),
  above a silver-based functional metallic layer and above and in contact with a crystallized dielectric layer, the crystallized dielectric layer is optionally separated from the silver-based functional metallic layer by at least one blocking overlayer (Ag/optionally blocking layer/crystallized layer/Zn sequence),
  below a silver-based functional metallic layer, the metallic zinc layer is in contact with the silver-based functional metallic layer (Zn/Ag sequence),
  below a silver-based functional metallic layer, the metallic zinc layer is separated from the silver-based functional metallic layer by at least one blocking underlayer (Zn/blocking layer/Ag sequence),
  below a silver-based functional metallic layer and above and in contact with a crystallized dielectric layer, the metallic zinc layer is in contact with the silver-based functional metallic layer (crystallized layer/Zn/Ag sequence), below a silver-based functional metallic layer and above and in contact with a crystallized dielectric layer, the metallic zinc layer is separated from the silver-based functional metallic layer by at least one blocking underlayer (crystallized layer/Zn/blocking layer/Ag sequence), below a silver-based functional metallic layer and below and in contact with a crystallized dielectric layer, the crystallized dielectric layer is in contact with or separated from the silver-based functional metallic layer by at least one blocking underlayer (Zn/crystallized layer/optionally blocking layer/Ag sequence).

The thickness of all the possible layers separating the metallic zinc-based layer and the functional layer is between 0 and 15.0 nm, or between 0 and 10 nm, or between 0 and 5 nm.

The thickness of all the layers separating the silver-based functional metallic layer from the zinc-based metallic layer can be:

greater than or equal to 0.2 nm, greater than or equal to 0.4 nm, greater than or equal to 0.5 nm, greater than or equal to 1 nm, greater than or equal to 2 nm, greater than or equal to 3 nm, greater than or equal to 4 nm, greater than or equal to 5 nm, greater than or equal to 6 nm, greater than or equal to 7 nm, greater than or equal to 8 nm or greater than or equal to 9 nm and/or less than or equal to 25 nm, less than or equal to 20 nm, less than or equal to 15 nm, less than or equal to 13 nm, less than or equal to 12 nm, less than or equal to 11 nm, less than or equal to 10 nm, less than or equal to 9 nm or less than or equal to 8 nm, less than or equal to 7 nm, less than or equal to 6 nm, less than or equal to 5 nm, less than or equal to 4 nm, less than or equal to 3 nm, less than or equal to 2 nm or less than or equal to 1.5 nm.

The thickness of all the layers separating the silver-based functional metallic layer from the zinc-based metallic layer can be between 0.2 and 5 nm, between 0.5 and 3 nm, or between 0.8 and 1.5 nm.

All the configurations according to which the zinc-based metallic layer is located above and not directly in contact with the silver-based functional metallic layer have, for an optimized thickness, a resistivity before heat treatment which is not deteriorated compared to a stack which does not comprise the zinc-based metallic layer.

According to the invention, a non-deteriorated resistivity is understood to mean a variation in resistivity attributable to the presence of the zinc-layer which is not greater than 15%, preferably not greater than 10%.

The configuration according to which the zinc-based metallic layer is located above and separated from the silver-based functional metallic layer by a blocking overlayer appears to give the best results.

The configuration according to which the zinc-based metallic layer is situated above and separated from the silver-based functional metallic layer by a blocking overlayer and a crystallized layer also gives good results.

It is also possible to use a blocking underlayer in these configurations. The use of a blocking underlayer enables an improvement in the mechanical strength. A blocking underlayer located below a silver layer and a zinc-based metallic layer located above and directly in contact with said silver layer, or separated from the silver layer by a crystallized layer and/or by a blocking overlayer, are then combined.

An explanation of the beneficial effect associated with the presence of a blocking overlayer or of a blocking underlayer close to the silver layer is as follows.

The silver layers are polycrystalline layers, that is to say composed of a plurality of monocrystalline silver grains. During the heat treatment, a rearrangement takes place which results in a decrease in the number of grains and an increase in the size of the grains.

It is possible that the metallic zinc species diffuse very efficiently into the stack, that is to say at temperatures lower than the temperatures at which this rearrangement occurs.

The case where the zinc-based metallic layer is located above the silver layer is considered. If the metallic zinc elements diffuse at these lower temperatures in the absence of a blocking overlayer, they could easily pass through the silver layer without being sufficiently retained. In this case, the effect on the modification of the mechanical properties and resistivity would be smaller.

However, when a blocking overlay is inserted between the silver and zinc layers, the blocking layer could act as a barrier and slow down the diffusion of the metallic zinc elements. This would make it possible to retain the metallic zinc elements in the silver layer when the higher rearrangement temperatures of the silver layer are reached. The metallic zinc elements would then be retained close to the silver layer. This would explain the significant impact of the presence of the blocking layer on the mechanical properties and on the resistivity.

To a lesser extent, the use of a blocking underlayer also performs the function of preventing the diffusion of the metallic zinc elements and of confining them close to the silver layer. Configurations according to this embodiment can be advantageous.

The configurations according to which the zinc-based metallic layer is located below and close to the silver-based functional metallic layer exhibit a deteriorated resistivity before heat treatment. A possible explanation is that the zinc layer under the silver layer increases the roughness of the lower interface of the silver layer. This is observed when the zinc-based metallic layer is located in contact with a silver-based functional metallic layer or is separated from this silver-based functional metallic layer by at least one blocking underlayer.

According to the invention, the term "layer located close to" is understood to mean a layer located, in increasing order of preference, at less than 15 nm, at less than 10 nm, at less than 5 nm, at less than 4 nm, at less than 3 nm or at less than 2 nm from another layer.

The following embodiments are advantageous:

the zinc-based metallic layer is located close to the silver layer, and/or the zinc-based metallic layer and the nickel oxide-based layer are separated by the silver layer, and/or the zinc-based metallic layer is located above the silver layer, the zinc-based metallic layer is located above the silver layer and the nickel oxide-based layer is located below the silver layer.

The zinc-based metallic layers, in order to be effective, must allow the diffusion of metallic zinc elements toward the silver layer. It is likely that if these zinc layers are separated from the silver layer:

by one or more excessively thick dielectric layers, for example excessively thick layers of zinc tin oxide, and/or by one or more dielectric layers having a barrier function, such as layers of nitrides of silicon and/or of aluminum and/or of zirconium, then the diffusion of these metallic zinc elements will be greatly reduced or even prevented. The zinc-based metallic layer then becomes ineffective from the point of view of improving the mechanical properties.

It appears that the crystallized layers do not prevent the migration of the metallic zinc elements. On the other hand, the presence of these layers slows this migration simply because of their thickness. Preferably, zinc-based metallic layers are separated from the silver layer by blocking layers and/or crystallized layers.

According to the invention, the stack comprises at least one silver-based functional metallic layer.

The silver-based functional metallic layer, before or after heat treatment, comprises at least 95.0%, preferably at least 96.5% and better still at least 98.0%, by weight of silver relative to the weight of the functional layer.

Preferably, the silver-based functional metallic layer before heat treatment comprises less than 1.0% by weight of metals other than silver, relative to the weight of the silver-based functional metallic layer.

After heat treatment, the silver-based functional metallic layer may comprise a proportion of zinc. Measurement of the doping with zinc can be carried out for example by Castaing microprobe analysis (electron probe microanalyzer or EPMA) or by measurement by atom probe tomography.

The thickness of the silver-based functional layer is from 5 to 25 nm.

The stack of thin layers comprises at least one functional layer and at least two dielectric coatings including at least one dielectric layer, so that each functional layer is disposed between two dielectric coatings.

The stack of thin layers can comprise at least two silver-based metallic functional layers and at least three dielectric coatings including at least one dielectric layer, so that each functional layer is disposed between two dielectric coatings.

The stack of thin layers can comprise at least three functional layers and at least four dielectric coatings including at least one dielectric layer, so that each functional layer is disposed between two dielectric coatings.

The invention is not limited to the insertion of a single zinc-based metallic layer. It is obviously possible to have a zinc-based metallic layer close to at least two silver-based functional layers or each silver-based functional layer.

A stack may thus comprise one or more zinc-based metallic layers.

The stack comprising at least two silver-based metallic functional layers can comprise at least two zinc-based metallic layers close to at least two silver-based metallic functional layers.

It is also possible, in stacks with several silver-based functional layers, for each silver-based metallic functional layer to be situated close to a zinc-based metallic functional layer.

The stack is located on at least one of the faces of the transparent substrate.

The term "dielectric coatings" within the meaning of the present invention should be understood as meaning that there may be a single layer or several layers of different materials within the coating. A "dielectric coating" according to the invention comprises predominantly dielectric layers. However, according to the invention these coatings can also comprise layers of another nature, in particular absorbent, for example metallic, layers.

It is considered that a given dielectric coating is located:
between the substrate and the first functional layer,
between each functional layer,
above the last functional layer (furthest from the substrate).

The term "dielectric layer", within the meaning of the present invention, should be understood as meaning that, from the viewpoint of its nature, the material is "nonmetallic", that is to say is not a metal. In the context of the invention, this term denotes a material having an n/k ratio over the whole visible wavelength range (from 380 nm to 780 nm) of equal to or greater than 5. n denotes the real refractive index of the material at a given wavelength and k represents the imaginary part of the refractive index at a given wavelength, the ratio n/k being calculated at the same given wavelength for both n and k.

The thickness of a dielectric coating corresponds to the sum of the thicknesses of the layers constituting it.

The coatings exhibit a thickness of greater than 15 nm, preferably of between 15 and 200 nm.

The dielectric layers of the coatings exhibit the following characteristics, alone or in combination:
they are deposited by magnetic field-assisted cathode sputtering,
they are chosen from the oxides or nitrides of one or more elements chosen from titanium, silicon, aluminum, zirconium, tin and zinc,
they have a thickness of greater than or equal to 2 nm, preferably of between 2 and 100 nm.

Preferably, the dielectric coating located directly below the silver-based functional metallic layer includes at least one crystallized dielectric layer as defined above, in particular based on zinc oxide, optionally doped using at least one other element, such as aluminum.

In all stacks, the dielectric coating closest to the substrate is called lower coating and the dielectric coating furthest from the substrate is called upper coating. Stacks with more than one silver layer also comprise intermediate dielectric coatings located between the lower and upper coatings.

Preferably, the lower or intermediate coatings comprise a zinc oxide-based crystallized dielectric layer located directly in contact with the silver-based metallic layer or separated by a blocking underlayer.

Preferably, the intermediate or upper coatings comprise a zinc oxide-based crystallized dielectric layer located directly in contact with the silver-based metallic layer or separated by a blocking overlayer.

The zinc oxide layers have a thickness:
of at least 1.0 nm, of at least 2.0 nm, of at least 3.0 nm, of at least 4.0 nm, of at least 5.0 nm, and/or
of at most 25 nm, of at most 10 nm, of at most 8.0 nm.

The dielectric layers can exhibit a barrier function. Dielectric layers having a barrier function (hereinafter barrier layer) is understood to mean a layer made of a material capable of forming a barrier to the diffusion of oxygen and water at high temperature, originating from the ambient atmosphere or from the transparent substrate, toward the functional layer. Such dielectric layers are chosen from the layers:
based on silicon and/or aluminum and/or zirconium compounds chosen from oxides, such as $SiO_2$, nitrides, such as silicon nitride $Si_3N_4$ and aluminum nitrides AlN, and oxynitrides $SiO_xN_y$, optionally doped using at least one other element,
based on zinc tin oxide,
based on titanium oxide.

Preferably, each coating includes at least one dielectric layer consisting:
of an aluminum and/or silicon and/or zirconium nitride or oxynitride, or
of a mixed zinc tin oxide, or
of a titanium oxide.

Preferably, each dielectric coating includes at least one dielectric layer which has a barrier function and is based on an aluminum and/or silicon and/or zirconium nitride. Preferably, the sum of the thicknesses of all the dielectric layers which have a barrier function and are based on aluminum and/or silicon and/or zirconium nitride in each dielectric coating is greater than or equal to 15 nm, or greater than or equal to 20 nm.

These dielectric layers have, in increasing order of preference, a thickness:
 of less than or equal to 40 nm, of less than or equal to 30 nm, of less than or equal to 25 nm, and/or
 of greater than or equal to 5 nm, of greater than or equal to 10 nm or of greater than or equal to 15 nm.

The stack of thin layers can optionally comprise a protective layer. The protective layer is preferably the final layer of the stack, that is to say the layer furthest from the substrate coated with the stack (before heat treatment). These layers generally have a thickness of between 0.5 and 10 nm, preferably 1 and 5 nm. This protective layer can be chosen from a layer of titanium, of zirconium, of hafnium, of silicon, of zinc and/or of tin, this or these metals being in the metal, oxide or nitride form.

According to one embodiment, the protective layer is based on zirconium and/or titanium oxide, preferably based on zirconium oxide, on titanium oxide or on titanium zirconium oxide.

The substrate coated with the stack or the stack alone is intended to undergo a heat treatment. However, the present invention also relates to the non-heat-treated coated substrate.

The stack may not have undergone a heat treatment at a temperature of greater than 500° C., preferably 300° C.

The stack may have undergone a heat treatment at a temperature of greater than 300° C., preferably 500° C.

The heat treatments are chosen from an annealing, for example by rapid thermal annealing ("rapid thermal process") such as a laser or flash lamp annealing, tempering and/or bending. Rapid thermal annealing is for example described in the application WO2008/096089.

The heat treatment temperature (at the stack) is greater than 300° C., preferably greater than 400° C., and better still greater than 500° C.

The substrate coated with the stack may be a curved or tempered glass.

The transparent substrates according to the invention are preferably made of a rigid inorganic material, for instance made of glass, or are organic, based on polymers (or made of polymer).

The transparent organic substrates according to the invention, which are rigid or flexible, can also be made of polymer. Examples of polymers suitable according to the invention comprise in particular:
 polyethylene;
 polyesters, such as polyethylene terephthalate (PET), polybutylene terephthalate (PBT) or polyethylene naphthalate (PEN);
 polyacrylates, such as polymethyl methacrylate (PMMA);
 polycarbonates;
 polyurethanes;
 polyamides;
 polyimides;
 fluoropolymers, for instance fluoroesters, such as ethylene-tetrafluoroethylene (ETFE), polyvinylidene fluoride (PVDF), polychlorotrifluoroethylene (PCTFE), ethylene-chlorotrifluoroethylene (ECTFE) or fluorinated ethylene-propylene copolymers (FEP);
 photocrosslinkable and/or photopolymerizable resins, such as thiolene, polyurethane, urethane-acrylate or polyester-acrylate resins; and
 polythiourethanes.

The substrate is preferably a sheet of glass or of glass-ceramic.

The substrate is preferably transparent, colorless (it is then a clear or extra-clear glass) or colored, for example blue, gray or bronze. The glass is preferably of soda-lime-silica type but it can also be a glass of borosilicate or alumino-borosilicate type.

According to a preferred embodiment, the substrate is made of glass, in particular soda-lime-silica glass, or of a polymeric organic substance.

The substrate advantageously has at least one dimension greater than or equal to 1 m, or 2 m and even 3 m. The thickness of the substrate generally varies between 0.5 mm and 19 mm, preferably between 0.7 and 9 mm, in particular between 2 and 8 mm, or between 4 and 6 mm. The substrate may be flat or curved, or even flexible.

The invention also relates to a glazing comprising at least one material according to the invention. The invention relates to a glazing which can be in the form of monolithic, laminated or multiple glazing, in particular double glazing or triple glazing.

A monolithic glazing comprises 2 faces; face 1 is outside the building and thus constitutes the exterior wall of the glazing and face 2 is inside the building and thus constitutes the interior wall of the glazing.

A multiple glazing comprises at least one material according to the invention and at least one additional substrate, the material and the additional substrate are separated by at least one intermediate gas-filled space. The glazing provides a separation between an exterior space and an interior space.

A double glazing comprises 4 faces; face 1 is outside the building and thus constitutes the exterior wall of the glazing and face 4 is inside the building and thus constitutes the interior wall of the glazing, faces 2 and 3 being inside the double glazing.

A laminated glazing comprises at least one structure of first substrate/sheet(s)/second substrate type. The polymeric sheet can in particular be based on polyvinyl butyral PVB, ethylene/vinyl acetate EVA, polyethylene terephthalate PET or polyvinyl chloride PVC. The stack of thin layers is positioned on one at least of the faces of one of the substrates.

These glazings may be fitted to a building or a vehicle.

These glazings may be fitted to devices such as oven or refrigerator doors.

The following examples illustrate the invention.

EXAMPLES

I. Preparation of the Substrates: Stacks, Deposition Conditions

Stacks of thin layers defined below are deposited on substrates made of clear soda-lime glass with a thickness of 2 or 4 mm.

In the examples of the invention:
- the functional layers are silver (Ag) layers,
- the blocking layers are metallic layers made of alloy of nickel and of chromium (NiCr),
- the nickel oxide NiOx-based layers are based on nickel and on chromium,
- the dielectric layers are based on silicon nitride, doped with aluminum ($Si_3N_4$:Al) and on zinc oxide (ZnO).

The conditions for deposition of the layers, which were deposited by sputtering ("magnetron cathode" sputtering), are summarized in table 1.

TABLE 1

| | Target employed | Deposition pressure | Gas |
|---|---|---|---|
| Ag | Ag | $8 \times 10^{-3}$ mbar | 100% Ar |
| Zn | Zn | $2 \times 10^{-3}$ mbar | 100% Ar |
| NiCr | Ni:Cr at 80%:20% by weight | $2 \times 10^{-3}$ mbar | 100% Ar |
| $Si_3N_4$ | Si:Al at 92%:8% by weight | $2 \times 10^{-3}$ mbar | 55% Ar/(Ar + $N_2$) |
| ZnO | Al:ZnO (5% Al by weight) | $2 \times 10^{-3}$ mbar | 100% Ar |
| NiCrOx | Ni:Cr at 80%:20% by weight | $2 \times 10^{-3}$ mbar | 32% $O_2$/(Ar + $O_2$) |

The tables below list the materials and the physical thicknesses in nanometers (unless otherwise indicated) of each layer or coating which forms the stacks as a function of their positions with regard to the substrate carrying the stack.

| Materials | Layers | Ref. 1 | Ref. 2 | Ref. 3 | Ref. 4 | Stack 1 | Stack 2 |
|---|---|---|---|---|---|---|---|
| Dielectric coating | $Si_3N_4$ | 30 | 30 | 30 | 30 | 30 | 30 |
| | ZnO | 5 | 5 | 5 | 5 | 5 | 5 |
| Zinc layer | Zn | — | 2 | — | 2 | 2 | 2 |
| Blocking layer OB | NiCr | 1 | 1 | 1 | 1 | 1 | 1 |
| Functional layer | Ag | 10 | 10 | 10 | 10 | 10 | 10 |
| Blocking layer UB | NiCr | — | — | 1 | 1 | 1 | 1 |
| Dielectric coating | ZnO | 5 | 5 | 5 | 5 | 5 | 5 |
| | NiCrOx | — | — | — | — | 1-5 | 3 |
| | ZnO | — | — | — | — | 5 | 5 |
| | $Si_3N_4$ | 20 | 20 | 20 | 20 | 20 | 20 |
| Substrate (mm) | glass | | | | | | |

| | Stack 1 | | | | |
|---|---|---|---|---|---|
| | Stack 1-1 | Stack 1-2 | Stack 1-3 | Stack 1-4 | Stack 1-5 |
| NiCrOx thickness | 1 nm | 2 nm | 3 nm | 4 nm | 5 nm |

II. Change in the Sheet Resistance and in the Absorption

The sheet resistance Rsq, corresponding to the resistance related to the surface area, is measured by induction with a Nagy SMR-12 instrument.

The sheet resistance and the absorption were measured before heat treatment (BT) and after heat treatments at a temperature of 650° C. for 10 min (AT).

The variation in resistivity was determined in the following way:

$\Delta Rsq_{(AT \text{ vs. } BT)} = (RsqAT - RsqBT)/RsqBT \times 100$.

a. Influence of the Thickness of the Nickel Oxide-Based Layer

The table below shows the results for sheet resistance obtained for coated substrates, after heat treatment at 650° C., as a function of the thickness of the nickel oxide-based layer.

| | Stack | | | | | | |
|---|---|---|---|---|---|---|---|
| | Ref. 1 | Ref. 2 | Stack 1-1 | Stack 1-2 | Stack 1-3 | Stack 1-4 | Stack 1-5 |
| Rsq AT | 4.29 | 7.24 | 5.74 | 4.91 | 4.33 | 4.22 | 4.19 |

The use of a zinc-based metallic layer significantly degraded the resistivity (comparison of Ref. 1 and Ref. 2).

For the materials comprising a nickel oxide-based layer (stacks 1-1 to 1-5), the resistivity decreased gradually for nickel oxide-based layer thicknesses of between 1 and 3 nm. These values then remain virtually constant for greater thicknesses.

The use of a 3 nm nickel oxide-based layer makes it possible to return to sheet resistance values of the same order as those obtained for materials not comprising the zinc-based metallic layer (comparison of Ref. 1 and Stack 1-3).

b. Stacks without Underblocker Layer

The table below shows the sheet resistance and absorption results obtained for coated substrates before and after tempering.

| | Rsq (Ω/□) | | ΔRsq (%) | Abs (%) | |
|---|---|---|---|---|---|
| Materials | BT | AT | (AT vs. BT) | BT | AT |
| Ref. 1 | 6.16 | 4.29 | 30 | 11 | 7 |
| Ref. 2 | 6.45 | 7.24 | −12 | 20 | 13 |
| Stack 1-1 | 6.54 | 5.74 | 12 | 18 | 12 |
| Stack 1-3 | 6.22 | 4.33 | 30 | 20 | 10 |

BT: Before heat treatment, AT: After heat treatment.

The material Ref. 1 (without zinc-based metallic layer and without nickel oxide-based layer) exhibits an improvement in resistivity equal to approximately 30% after heat treatment at 650° C.

The material Ref. 2 (with zinc-based metallic layer and without nickel oxide-based layer) exhibits a severely deteriorated absorption and emissivity following the heat treatment. The comparison of the materials Ref. 1 and Ref. 2 shows a loss of resistivity. This is expressed by negative ΔRsq values and represents a drop from +30% to −12%. The absorption, for its part, increases from 7 to 13%.

When a nickel oxide-based layer is added in the dielectric coating located below the silver layer, the improvement in resistivity increases gradually with increasing nickel oxide-based layer thicknesses.

The material Stack 1-1 exhibits an improvement in resistivity of 12%.

The material Stack 1-3 exhibits an improvement of approximately 30%. The improvement and the sheet resistance are equivalent to those of Ref. 1.

The solution of the invention makes it possible to obtain low resistivity values which in particular are as low as those obtained with materials without metallic zinc layer and without nickel oxide-based layer.

The absorption decreases gradually with increasing nickel oxide-based layer thicknesses. The material Stack 1-3 exhibits an absorption of 10%, i.e. a decrease of 3% compared to Ref. 2.

In contrast to the resistivity, the solution of the invention makes it possible to significantly lower the absorption but does not make it possible to obtain values as low as those obtained with materials without zinc-based metallic layer and without nickel oxide-based layer.

One possible explanation could be that the nickel oxide-based layer makes it possible to a certain extent to attract to said layer all or some of the metallic zinc elements which have migrated into the silver layer and are situated at the interfaces or between the grain boundaries of the silver layer. This removal makes it possible to regain excellent resistivity values and to lower the absorption.

c. Stacks Comprising an Underblocker Layer

The table below shows the sheet resistance and absorption results obtained for coated substrates before and after tempering.

| Material | Rsq ($\Omega/\square$) | | ΔRsq (%) | Abs (%) | |
|---|---|---|---|---|---|
| | BT | AT | (AT vs. BT) | BT | AT |
| Ref. 3 | 7.3 | 4.9 | 33 | 14 | 9 |
| Ref. 4 | 8.1 | 7.8 | 4 | 22 | 16 |
| Stack 2 | 7.5 | 5.0 | 33 | 26 | 15 |

BT: Before heat treatment, AT: After heat treatment.

The presence of a zinc-based metallic layer brings about a deterioration in the improvement in resistivity normally observed following a heat treatment.

When the stack comprises a blocking underlayer and comprises a zinc-based metallic layer (Ref. 4), an improvement in resistivity of 4% is observed. The example Ref. 3, comprising a blocking underlayer and not comprising a zinc layer, exhibits an improvement of 33%.

However, the resistivity deteriorates significantly less when the stack comprises a blocking underlayer. Specifically, in the presence of a blocking underlayer, the impact of the incorporation of a zinc-based metallic layer on the resistivity after heat treatment is less severe (comparison Ref. 2 and Ref. 3, ΔRsq of 4% and −12% respectively).

In the same way as for materials without blocking underlayer, the nickel oxide-based layer makes it possible to completely recover the improvement in resistivity (Ref. 3 and Stack 2, ΔRsq of 33%).

III. Mechanical Properties

Erichsen scratch tests (ESTs) were carried out under the following conditions:

EST: This test consists in applying a tip (Van Laar tip, steel ball) with a given force (in newtons) to produce a scratch in the stack and possibly to report the width of the scratches. The EST test (without other qualifier) is carried out without heat treatment.

EST-HT: This test consists in performing an EST test followed by a heat treatment under the following conditions: Force applied: 0.3 N, 0.5 N, 0.8 N, 1 N, 3 N or 5 N; heat treatment, 10 minutes at a temperature of 650° C., HT-EST: This test consists in performing a heat treatment followed by an EST test under the following conditions: Heat treatment, 10 minutes at a temperature of 650° C.; force applied: 0.3 N, 0.5 N, 0.8 N, 1 N, 3 N or 5 N.

a. Stacks without Underblocker Layer

The table below shows the results of the HT-EST test after heat treatment at 650° C. and reports the measurements of the width of the scratches in μm with an applied force of 0.8 N.

| | | Ref. 1 | Ref. 2 | Stack 1-1 | Stack 1-3 |
|---|---|---|---|---|---|
| HT-EST 0.8N | Scratch width (μm) | 20 | 14 | 15 | 16 |
| HT-EST 3N | Scratch width (μm) | 47 | 32 | 31 | 35 |

The materials Ref.1 (without zinc-based metallic layer and without nickel oxide-based layer) and Ref. 2 (with zinc-based metallic layer and without nickel oxide-based layer) respectively exhibit a scratch width of 20 μm and of 14 μm in the HT-EST 0.8 N test. A similar trend is also observed for the scratch width in the HT-EST 3 N test. A decrease in scratch visibility is also observed (comparison Ref. 1 and Ref. 2). The use of a zinc-based metallic layer significantly improves the scratch resistance.

The solution of the invention, combining a metallic zinc layer and a nickel oxide-based layer, makes it possible to obtain excellent scratch resistance.

The comparison between Ref 2 (comprising only a zinc oxide-based layer) and Stack 1-3 according to the invention shows a very small, slight increase in the scratch width, for the HT-EST tests at 0.8 and 0.3 N, respectively, of 14 and 34 μm (Ref. 2) to 16 to 35 μm (Stack 1-3). This increase is very small, in particular when comparing the scratch width in the HT-EST at 0.8 and 0.3 N of Ref. 1 which is 20 and 47 μm, respectively.

The addition of a nickel oxide-based layer in the dielectric coating located below the silver layer thus makes it possible to retain the advantageous mechanical properties observed in the presence of a zinc-based metallic layer (comparison with Ref. 2).

These examples show that an excellent scratch resistance is obtained for nickel oxide-based layer thicknesses of between 1 and 3 nm, which is expressed by small scratch widths. In alternative embodiments, an improvement could be observed for lower thickness ranges.

b. Stacks Comprising an Underblocker Layer

The HT-EST and EST-HT tests were performed for the Stack 2. The results are similar to those obtained with the Stack 1-3.

Consequently, the use of a blocking underlayer is not detrimental to the obtaining of the positive effect of the insertion of zinc-based metallic layer.

IV. Microscopic Observations: Hot Corrosion

The morphology of the layers is analyzed by optical microscopy. Images of the scratches were taken after EST at 1 and 5 N and heat treatment at 650° C. (EST-HT).

Figure 1:
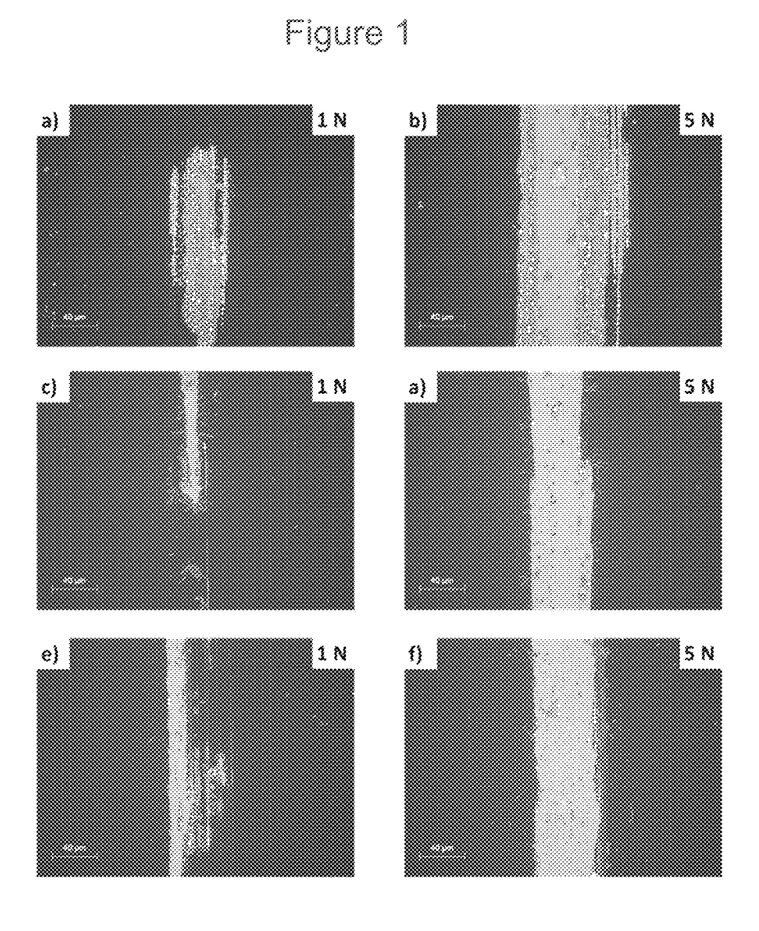
FIGS. 1A-1F are images taken under a microscope of scratches made after indentation with a force of 1 or 5 N followed by heat treatment.

FIG. 1-a, 1-b, 1-c, 1-d, 1-e and 1-f are images taken under a microscope of scratches made after indentation with a force of 1 or 5 N followed by heat treatment.

|  | EST-HT 1N | | EST-HT 5N | |
| --- | --- | --- | --- | --- |
|  | Image | Width | Image | Width |
| Ref. 1 | 1-a | 20-70 | 1-b | 60-120 |
| Ref. 2 | 1-c | 0-20 | 1-d | 40-60 |
| Stack 1-3 | 1-e | 10-40 | 1-f | 40-60 |

The scratches, when they are present, are much thinner for the material comprising a zinc-based metallic layer (Ref. 2 and Stack 1-3) than for the material Ref. 1. But most significantly, the scratches in the materials comprising a zinc-based metallic layer are not corroded at all.

The addition of the nickel oxide-based layer does not prevent the advantageous effects associated with the presence of the zinc-based metallic layer. The images following the EST-HT test clearly show that the scratched portions of the stack comprising both a nickel oxide-based layer and a zinc-based metallic layer are not corroded.

This demonstrates that the beneficial effect of the zinc-based metallic layer on the resistance to hot corrosion is maintained even when a nickel oxide-based layer is added to the stack.

V. Microscopic Observation: Cold Corrosion

High-humidity tests (HH tests) were carried out. These tests consist in placing the materials at 90% humidity and at 50° C. for 5 and 20 days. The materials tested are Ref 1, Ref 2 and Stack 1-3. The tests were carried out on non-heat-treated materials (BT) and on heat-treated materials (AT). The table above indicates whether sites of corrosion (Corr. sites) are observed. The following ratings are given:
 "0": no corrosion sites,
 "+": some corrosion sites,
 "++": visible corrosion sites,
 "+++": many corrosion sites.

FIGS. 2a-i comprise optical images showing the visibility of corrosion after 5 and 20 days of the HH test on non-heat-treated materials and after 20 days of the HH test on heat-treated materials.

Figure 3:
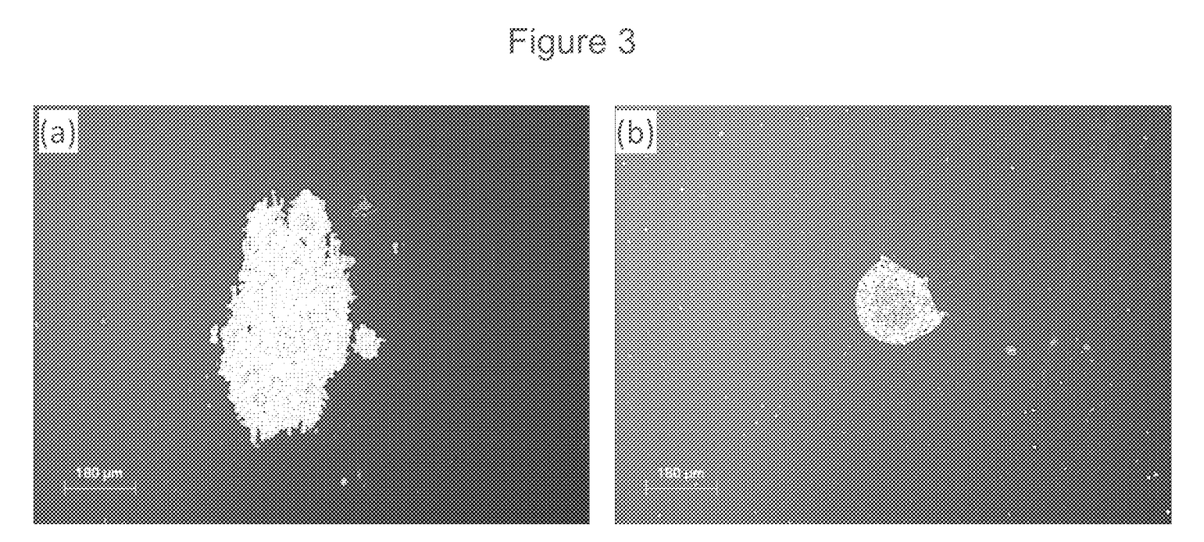
FIGS. 3A-3B are optical images showing the defects due to corrosion after 5 days of the HH test for the non-heat-treated (FIG. 3-a) and heat-treated (FIG. 3-b).

FIGS. 3a-b comprise optical images showing the defects due to corrosion after 5 days of the HH test for the non-heat-treated (FIG. 3-a) and heat-treated (FIG. 3-b) reference material Ref. 1.

| HH test | BT: 5 days | | BT: 20 days | | AT: 20 days | |
| --- | --- | --- | --- | --- | --- | --- |
|  | Images | Corr. sites | Images | Corr. sites | Images | Corr. sites |
| Ref. 1 | 2-a, 3-a | + | 2-b | ++ | 2-c | +++ |
| Ref. 2 | 2-d | 0 | 2-e | 0 | 2-f | + |
| Stack 2 | 2-g | 0 | 2-h | 0 | 2-i | + |

BT: Before heat treatment, AT: After heat treatment, "—": no image.

Figure 2:
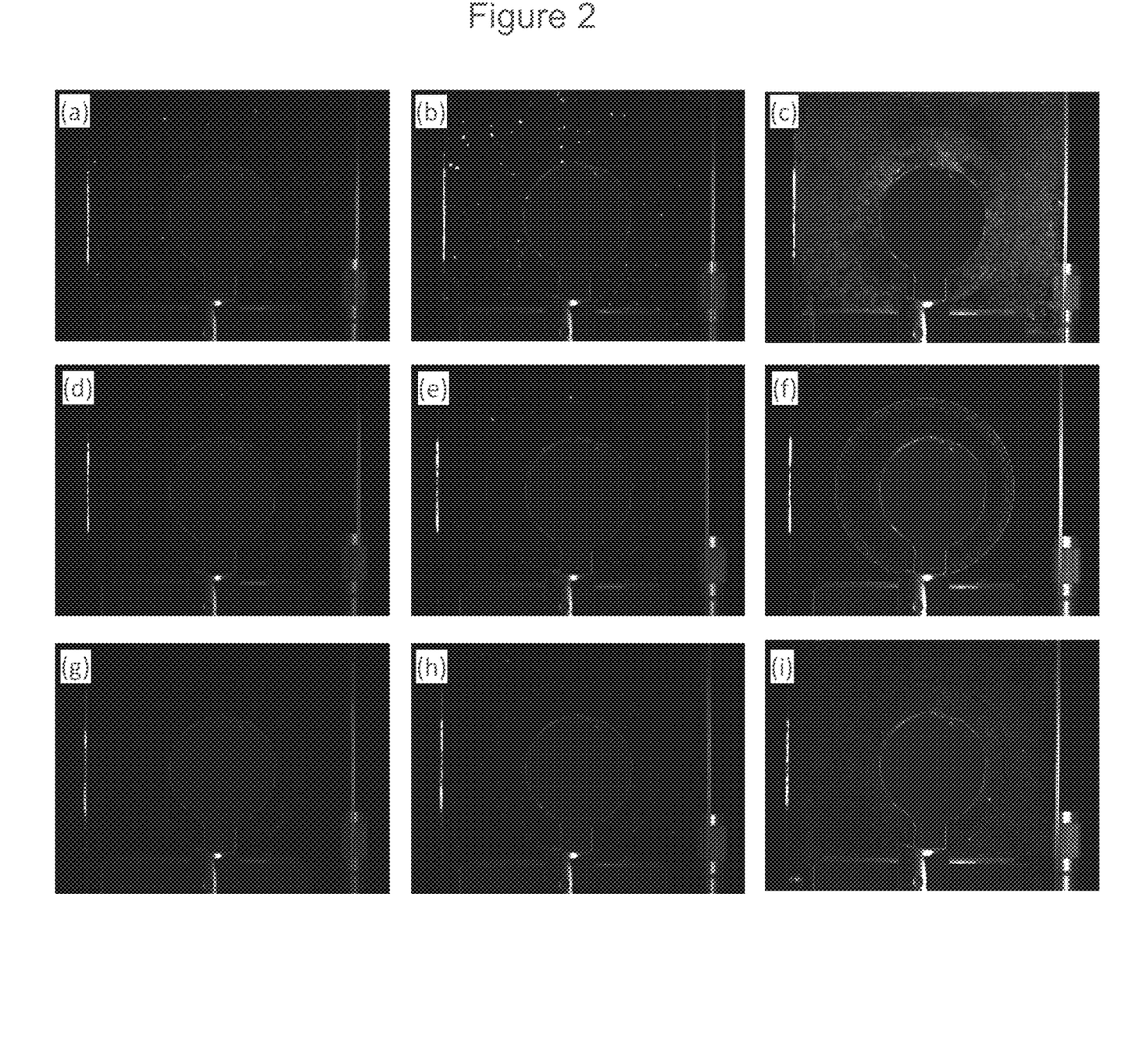
FIGS. 2A-2I are optical images showing the visibility of corrosion after 5 and 20 days of the HH test on non-heat-treated materials and after 20 days of the HH test on heat-treated materials.

The stack Ref. 1 without heat treatment exhibits corrosion defects visible to the eye after 5 days of the HH test (FIGS. 2-a and 3-a). The density of the corrosion sites increases after 20 days of the HH test (FIG. 2-b).

For the materials comprising a zinc-based metallic layer without heat treatment, the presence of a zinc-based metallic layer limits the formation of corrosion sites (FIGS. 2-d, 2-e and 2-g, 2-h). No corrosion sites are observed after 5 days and only a few sites are observed after 20 days. The addition of a zinc-based metallic layer significantly increases the resistance to cold corrosion for heat-treated or non-heat-treated materials.

The heat-treated stack Ref. 1 becomes completely hazy after 20 days (FIG. 2-c). Characterization under an optical microscope after 5 days (FIG. 3-b) shows a very high density of microscopic-scale defects in addition to the wide corrosion defects already observed for the non-heat-treated material (FIG. 2-a).

For the heat-treated materials according to the invention, the presence of a zinc-based metallic layer prevents the formation of haze associated with cold corrosion.

In conclusion, the addition of a nickel oxide-based layer makes it possible to retain the excellent resistance to cold corrosion which is observed in the presence of a zinc-based metallic layer (comparison with Ref. 2). After 20 days of the HH test, the materials according to the invention, heat-treated or non-heat-treated, comprise very few, if any, sites of corrosion or haze (FIG. 2-h, 2-i) in contrast to the material of Ref. 1 (FIG. 2-b, 2-c).

By virtue of the incorporation of a zinc-based metallic layer, a significant improvement in the resistance to cold corrosion is observed both in heat-treated and non-heat-treated materials.

VI. Conclusion

The solution of the invention makes it possible to obtain low resistivity values, in particular of the same order as those obtained for materials not comprising the zinc oxide-based layer (comparison of Ref. 1 and Stack 1-3). For this, the nickel oxide-based layer should preferably have a thickness of greater than or equal to 0.5 nm, greater than or equal to 1 nm, 2 nm, 2.5 nm, or 3 nm. However, in alternative embodiments, an improvement could be observed for lower nickel oxide layer thickness ranges.

The solution of the invention makes it possible to significantly lower the absorption, but does not make it possible to obtain values which are as low as those obtained with materials without metallic zinc layer and without nickel oxide-based layer (comparison Stack 1-3, and Ref. 1, Ref. 2).

The solution of the invention makes it possible both to obtain an excellent scratch resistance but also to completely re-establish a low resistivity and to obtain a moderate absorption. The addition of a nickel oxide-based layer makes it possible to retain the advantageous mechanical properties observed in the presence of a zinc-based metallic layer (comparison with Ref. 2).

The solution of the invention makes it possible to significantly improve the resistance to hot corrosion. Specifically, the observation following the EST-HT test clearly shows that the scratched portions of the stack comprising both a nickel oxide-based layer and a zinc-based metallic layer are not corroded. The beneficial effect of the zinc-based metallic layer on the resistance to hot corrosion is maintained even when a nickel oxide-based layer is added to the stack.

Lastly, the solution of the invention makes it possible to significantly improve the resistance to cold corrosion. The addition of a nickel oxide-based layer makes it possible to retain the excellent resistance to cold corrosion observed in the presence of a zinc-based metallic layer. The materials according to the invention, heat-treated or non-heat-treated, comprise very few, if any, sites of corrosion or of haze.

The positive effect on the resistivity, the absorption, the mechanical strength, the resistance to hot corrosion and the resistance to cold corrosion is obtained in the presence and in the absence of an underblocker layer in contact with the silver layer.

The invention claimed is:

1. A material comprising a transparent substrate coated with a stack of thin layers comprising at least one silver-based functional metallic layer and at least two dielectric coatings, each dielectric coating including at least one dielectric layer, so that each silver-based functional metallic layer is disposed between two dielectric coatings,
wherein the stack comprises:
a zinc-based metallic layer, located above or below a silver-based functional metallic layer, the zinc-based metallic layer comprising at least 20% by weight of zinc relative to the weight of the zinc-based metallic layer,
a nickel oxide-based layer located below the silver-based functional metallic layer and being separated from the silver-based functional metallic layer by at least one crystallized dielectric layer, wherein the nickel oxide-based layer comprises at least 1% by weight of one or more metallic elements other than nickel relative to the total weight of all the elements constituting the nickel oxide-based layer excluding oxygen and nitrogen, and
a zinc oxide-based crystallized dielectric layer located below and in contact with the nickel oxide-based layer.

2. The material as claimed in claim 1, wherein the at least one crystallized dielectric layer is a zinc oxide-based crystallized dielectric layer, located between the silver-based functional metallic layer and the nickel oxide-based layer.

3. The material as claimed in claim 1, wherein the at least one crystallized dielectric layer is an oxide-based crystallized layer.

4. The material as claimed in claim 1, wherein the nickel oxide-based layer has a thickness of between 0.2 and 10.0 nm.

5. The material as claimed in claim 1, wherein the thickness of the only or of all the layers separating the nickel oxide-based layer and the silver-based functional metallic layer is between 0.5 and 15.0 nm, or between 0.7 and 8.0 nm, or between 1.0 and 6.0 nm.

6. The material as claimed in claim 1, wherein the stack comprises at least one blocking layer located directly in contact with the silver-based functional metallic layer.

7. The material as claimed in claim 6, wherein the at least one blocking layer is chosen from metallic layers based on a metal or on a metal alloy, metal nitride layers, metal oxide layers and metal oxynitride layers of one or more elements chosen from titanium, nickel, chromium, tantalum and niobium.

8. The material as claimed in claim 1, wherein the zinc-based metallic layer and the nickel oxide-based layer are separated by the silver-based functional metallic layer.

9. The material as claimed in claim 1, wherein the zinc-based metallic layer is located above the silver-based functional metallic layer.

10. The material as claimed in claim 1, wherein the zinc-based metallic layer is located above the silver-based functional metallic layer and is separated from the silver-based functional metallic layer by at least one blocking overlayer.

11. The material as claimed in claim 1, wherein a physical thickness of all the layers separating the zinc-based metallic layer and the functional layer is between 0 and 15.0 nm, or between 0 and 10 nm, or between 0 and 5 nm.

12. The material as claimed in claim 1, wherein a thickness of the zinc-based metallic layer is from 0.2 to 10 nm.

13. The material as claimed in claim 1, wherein each dielectric coating includes at least one dielectric layer which has a barrier function and is based on an aluminum and/or silicon and/or zirconium nitride.

14. The material as claimed in claim 1, wherein the stack has not undergone a heat treatment at a temperature of greater than 500° C.

15. The material as claimed in claim 1, wherein the stack has undergone a heat treatment at a temperature of greater than 300° C.

16. The material as claimed in claim 1, wherein the substrate is made of glass or of a polymeric organic substance.

17. A glazing comprising a material as claimed in claim 1, wherein the glazing is in the form of monolithic, laminated or multiple glazing.

* * * * *